United States Patent
Gupta et al.

(10) Patent No.: US 9,436,446 B1
(45) Date of Patent: Sep. 6, 2016

(54) SYSTEM FOR AUTOMATING CALCULATION OF A COMPREHENSIBILITY SCORE FOR A SOFTWARE PROGRAM

(71) Applicant: International Business Machines Corporation, Armonk, NY (US)

(72) Inventors: Vivek K. Gupta, Gurgaon (IN); Manish Kataria, Delhi (IN); Nihar Tiku, Gurgaon (IN)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 14/941,791

(22) Filed: Nov. 16, 2015

(51) Int. Cl.
*G06F 9/45* (2006.01)

(52) U.S. Cl.
CPC ............... *G06F 8/425* (2013.01); *G06F 8/427* (2013.01)

(58) Field of Classification Search
CPC ................... G06F 8/425; G06F 8/427; G06F 11/3668–11/3696; G06F 17/271
USPC .................................. 717/120–126, 141–143
See application file for complete search history.

(56) References Cited

U.S. PATENT DOCUMENTS

| | | | | |
|---|---|---|---|---|
| 4,456,973 A * | 6/1984 | Carlgren | ............ | G06F 17/2795 704/1 |
| 6,523,172 B1 * | 2/2003 | Martinez-Guerra | .... | G06F 8/427 704/9 |
| 6,631,346 B1 * | 10/2003 | Karaorman | ......... | G10L 15/1822 704/275 |
| 7,062,760 B2 * | 6/2006 | Tonouchi | ............ | G06F 11/3616 706/47 |
| 7,610,192 B1 * | 10/2009 | Jamieson | ............... | G06Q 50/22 704/1 |
| 7,774,743 B1 * | 8/2010 | Sanchez | ................. | G06Q 10/06 717/101 |
| 7,930,302 B2 * | 4/2011 | Bandaru | ........... | G06F 17/30864 707/737 |
| 8,146,058 B2 * | 3/2012 | Sarkar | ...................... | G06F 8/10 717/101 |
| 8,296,719 B2 * | 10/2012 | Chaar | .................... | G06Q 10/00 700/95 |
| 8,572,504 B1 * | 10/2013 | Forstot | ..................... | G06F 8/20 715/764 |
| 8,713,031 B1 * | 4/2014 | Lee | ..................... | G06F 17/2705 704/9 |

(Continued)

OTHER PUBLICATIONS

From source code identifiers to natural language terms—Nuno Ramos Carvalho, José João Almeida, Pedro Rangel Henriques—Department of Informatics, University of Minho, Campus de Gualtar, 4710-057 Braga, Portugal, Maria João Varanda—Polytechnic Institute of Braganc, a, Campus de Santa Apolónia, 5300-253 Braganca, Portugal—Sep. 7, 2014.*

Normalizing Source Code Vocabulary—Dawn Lawrie, Dave Binkley, Christopher Morrell—Loyola University Maryland Baltimore MD—2010 17th Working Conference on Reverse Engineering—2010 IEEE.*

(Continued)

*Primary Examiner* — Francisco Aponte
(74) *Attorney, Agent, or Firm* — Edward P. Li

(57) ABSTRACT

A method, a computer program product, and a computer system for automating calculation of a comprehensibility score for a software program. An analytics engine on a computer matches tokens of the software program with a language dictionary, a domain specific vocabulary, and a language grammar. The analytics engine determines a comprehensibility score for the software program, based on matching tokens. The analytics engine provides the comprehensibility score to a reviewer evaluating the software program.

12 Claims, 2 Drawing Sheets

(56) References Cited

U.S. PATENT DOCUMENTS

| | | | | |
|---|---|---|---|---|
| 8,738,636 | B2* | 5/2014 | Jean-Mary | G06F 17/30734 707/736 |
| 8,813,027 | B2* | 8/2014 | Ng | G06F 8/437 717/106 |
| 8,898,619 | B2* | 11/2014 | Chaar | G06Q 10/00 700/95 |
| 9,021,441 | B2* | 4/2015 | Yawalkar | G06F 11/3616 717/124 |
| 9,164,742 | B2* | 10/2015 | Kraft | G06F 8/75 |
| 9,286,394 | B2* | 3/2016 | Ross | G06Q 10/06395 |
| 2009/0094019 | A1* | 4/2009 | Snow | G06F 17/2755 704/9 |
| 2010/0088674 | A1* | 4/2010 | Della-Libera | G06F 17/2705 717/114 |
| 2011/0022551 | A1* | 1/2011 | Dixon | G06F 11/3616 706/12 |
| 2011/0283270 | A1* | 11/2011 | Gass | G06F 8/71 717/168 |
| 2012/0192151 | A1* | 7/2012 | Parkes | G06F 8/34 717/120 |
| 2013/0232472 | A1 | 9/2013 | Korner et al. | |
| 2014/0013304 | A1* | 1/2014 | Vangala | G06F 8/75 717/123 |
| 2014/0059417 | A1* | 2/2014 | Bernelas | G06F 17/241 715/230 |
| 2014/0157239 | A1* | 6/2014 | Goetsch | G06F 11/3604 717/126 |
| 2014/0201702 | A1* | 7/2014 | Kaplinger | G06F 8/76 717/101 |
| 2014/0282442 | A1* | 9/2014 | Hoban | G06F 8/437 717/143 |
| 2014/0282443 | A1* | 9/2014 | Hoban | G06F 8/437 717/143 |
| 2015/0178075 | A1* | 6/2015 | Bommaraju | G06F 8/73 717/123 |
| 2015/0347128 | A1* | 12/2015 | Frenkiel | G06F 8/73 717/123 |
| 2016/0012033 | A1* | 1/2016 | Craymer, III | G06F 17/271 704/9 |

OTHER PUBLICATIONS

An Approach for Evaluating and Suggesting Method Names using N-gram Models—Takayuki Suzuki, Shinichi Honiden—The University of Tokyo, Tokyo, Japan; Kazunori Sakamoto, Fuyuki Ishikawa—ICPC '14, Jun. 2-3, 2014—Hyderabad, India.*

Quantifying Identi_er Quality: An Analysis of Trends—Dawn Lawrie, Henry Feild, David Binkley—Loyola College in Maryland—Empir Software Eng (2007)—Published online: Dec. 21, 2006 © Springer Science + Business Media, LLC 2006.*

Code Profiling—Static Code Analysis—Department of Computer Science—Thomas Borchert—Karlstads Universitet—2008.*

Source Code Retrieval Using Sequence Based Similarity—Yoshihisa Udagawa—Faculty of Engineering, Tokyo Polytechnic University, Atsugi City, Kanagawa, Japan—International Journal of Data Mining & Knowledge Management Process (IJDKP) vol. 3, No. 4, Jul. 2013.*

Natural Language Access to Databases: An Ontology Concept Mapping Approach—Lawrence Muchemi; University of Nairobi—Aug. 2014.*

Improving the Tokenisation of Identifier Names—Simon Butler, Michel Wermelinger, Yijun Yu, and Helen Sharp—Computing Department and Centre for Research in Computing, The Open University, Milton Keynes, United Kingdom—ECOOP 2011.*

Bacherler, Christian et al.; "Automated Test Code Generation Based on Formalized Natural Language Business Rules"; ISCSE 2012: The Seventh International conference on Software Engineering Advances; Copyright IARIA, 2012; pp. 165-171.

Buse, Raymond et al.; "Learning a Metric for Code Readability"; TSE Special Issue on the ISSTA 2008 Best Papers; pp. 1-14.

Jackson Wetting Lee; "Studies on Software Comprehensibility"; The University of Western Australia; 2009; pp. 1-59.

Zhang, Yonggang; "An Ontology-Based Program Comprehensibility Model"; A Thesis in the Department of Computer Science and Software Engineering; Sep. 2007; Copyright Yonggang Zhang, 2007; pp. 1-207.

* cited by examiner

SYSTEM FOR AUTOMATING CALCULATION OF A COMPREHENSIBILITY SCORE FOR A SOFTWARE PROGRAM

BACKGROUND OF THE INVENTION

Software development is no longer confined to a pool of developers behind closed doors. Teams involved in development of a software program now sits far apart across continents. To manage code delivery in such spread-out teams, senior developers in the teams are generally assigned responsibilities to manually approve all the codes.

When more and more programs to be assessed get stacked up for reviews, the reviews may be delayed. It is not humanly possible for reviewers to review code properly; however, due to business timelines, code gets approved. Continuous delivery practices try to negate this by introducing checks and balances to ensure quality (e.g., Travis CI which ensures code quality by checking for compilation errors).

Another important aspect of code quality is "comprehensibility". Software program's comprehensibility largely depends upon the descriptiveness and use of meaningful program constructs from natural languages as well as domain specific vocabulary.

Code reviews tend to focus on the functional aspect of code; however, the comprehensibility aspect unfortunately often takes a back seat in this setup. Programs written in mnemonics or non-meaningful vocabularies are difficult to understand and thus are more likely to take longer for bug fixing and specifically in cases where the software maintenance has to be done by another team.

There is no existing system which can either automatically calculate comprehensibility of a code to be assessed and help evaluators to make a decision whether to accept or reject the code.

One of the known techniques is to calculate a comment to code ratio, which is not a good indicator of program readability. These techniques do not look into the content of the commented lines in code. It is possible to have a good comment to code ratio by inserting even blank or invalid comments in the code.

SUMMARY

In one aspect, a method for automating calculation of a comprehensibility score for a software program is provided. The method comprises: an analytics engine on a computer matches tokens of the software program with a language dictionary, a domain specific vocabulary, and a language grammar; the analytics engine determines a comprehensibility score for the software program, based on matching tokens; and the analytics engine provides the comprehensibility score to a reviewer evaluating the software program.

In another aspect, a computer program product for automating calculation of a comprehensibility score for a software program is provided. The computer program product comprises a computer readable storage medium having program code embodied therewith. The program code is executable to: match tokens of the software program with a language dictionary, a domain specific vocabulary, and a language grammar; determine a comprehensibility score for the software program, based on matching tokens; and provide the comprehensibility score to a reviewer evaluating the software program.

In yet another aspect, a computer system for automating calculation of a comprehensibility score for a software program is provided. The computer system comprises one or more processors, one or more computer readable tangible storage devices, and program instructions stored on at least one of the one or more computer readable tangible storage devices for execution by at least one of the one or more processors. The program instructions are executable to match tokens of the software program with a language dictionary, a domain specific vocabulary, and a language grammar. The program instructions are executable to determine a comprehensibility score for the software program, based on matching tokens. The program instructions are executable to provide the comprehensibility score to a reviewer evaluating the software program.

DETAILED DESCRIPTION

Embodiments of the present invention disclose a system which automates calculation of a comprehensibility score for a software program by comparing its program constructs, such as functions, variable declarations, parameters, and comments, in the production rule with the domain and language ontologies. The system can become an effective tool for assessing maintenance and associated support effort. The readability score will help estimate extra efforts (or costs) required to maintain a software program due to complexity (or lack of simplicity) with respect to language semantics and domain specific focus. The system can be used as a standard measurement/scoring system for software developed using code generation tools, which require manual maintenance. The system helps extrapolate the likely effort required based on the key factors identified for such an assessment. The system greatly assists in continuous delivery methodology, by relieving the job of reviewers who manually ensure code readability quality. The system forces developers to use more specific and indicative names of constructs, such as class, fields, and APIs. In case these need to be non-intuitive, the system requires developers to include more comments for such constructs.

Some embodiments of the present invention are directed to automating code analysis for readability & maintainability at the time of check-in of revised program code as an update to an earlier version of the program code already in storage. This is particularly helpful when the program is being revised in a distributed development environment, where multiple developers are working on various portions of the same program. Additionally, some embodiment provide for automating the calculation of a comprehensibility score at the time of check-in of a revised software program by comparing its program constructs (functions, variable declarations, parameters, and comments) in the production rule with the domain and language ontologies, while working on the code.

Embodiments of the present invention are now described in detail with reference to the accompanying figures.

Figure 1:
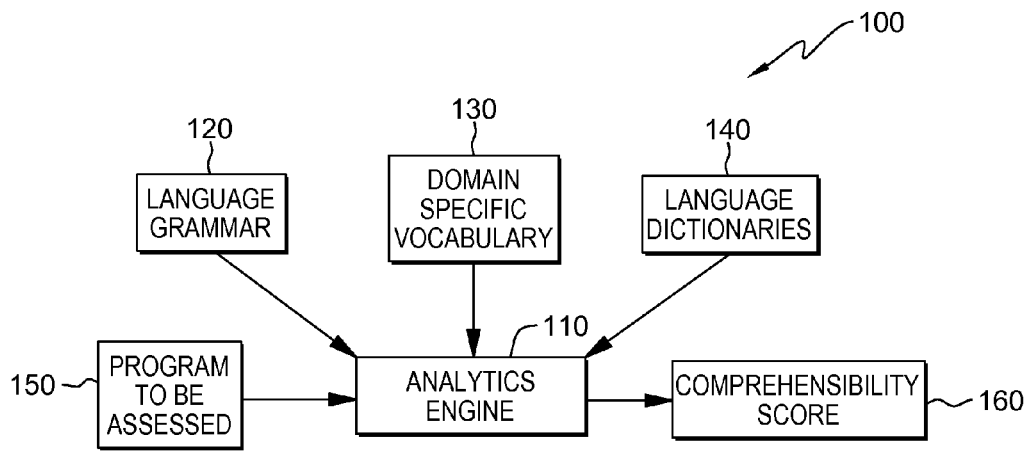
FIG. 1 is a diagram showing a system for automating calculation of a comprehensibility score for a software program, in accordance with one embodiment of the present invention.

FIG. 1 is a diagram showing system 100 for automating calculation of a comprehensibility score for a software program, in accordance with one embodiment of the present invention. System 100 comprises analytics engine 110, language grammar 120, domain specific vocabulary 130, and language dictionary 140. Analytics engine 110 receives program to be assessed 150, matches each of program tokens of program to be assessed 150 with language dictionary 140, domain specific vocabulary 130, and language grammar 120. Analytics engine 110 provides comprehensibility score 160 to a reviewer of program to be assessed 150.

System 100 analyzes code segments and respective comments with help of domain and language specific ontologies. If both code segments and respective comments are found to be in synch (or in relation to each other) code gets a higher comprehensibility score. An evaluator can automate the code repository system to only accept a software program (which are to be assessed) with a minimum comprehensibility score; therefore, system 100 saves needless review sessions.

Analytics engine 110 in system 100 matches each of the program constructs with natural language and domain vocabulary, and it gives a comprehensibility score for each token. For example, considering a program using terminology of English language, the program includes 3 classes such as Shape, Square, and Rectangle in the package named as Geometry. In the example, Square and Rectangle classes are subclasses of Shape class, and they have methods to calculate areas of 2D or 3D shapes, for example calculate2DArea or calculate3DArea. For this example, system 100 will look at each of program tokens (non-terminal symbols) including class names (e.g., Shape, Square, and Rectangle), method names (e.g., calculate2DArea and calculate3DArea), variable names (e.g., area, and length), and will match them with the English language dictionary. In cases where a compound word (e.g., calculate2DArea) is used, system 100 will try to match this compound word with different matching words of the dictionary (i.e., calculate and Area) to give it a particular comprehensibility score. The same technique can be applied for software programs written in any other languages other than English.

For comments in the program, system 100 will take the content of the comment and match the content for vocabulary and syntactic correctness because the content has more meaning in natural languages terms.

The comprehensibility score can be calculated by taking a percentage of the total number of matching token names over the total number of available tokens. The comprehensibility score can also be a weighted average derived from various categories of non-terminal symbols used or the categories of production rules applied. Whether the weighted average is derived from various categories of non-terminal symbols used or the categories of production rules applied is configurable by system 100. Also, additional algorithms can applied to match particular types of tokens with grammar; for example, by determining whether a class name is a noun and a method name is a verb, system 100 will add additional score points.

Figure 2:
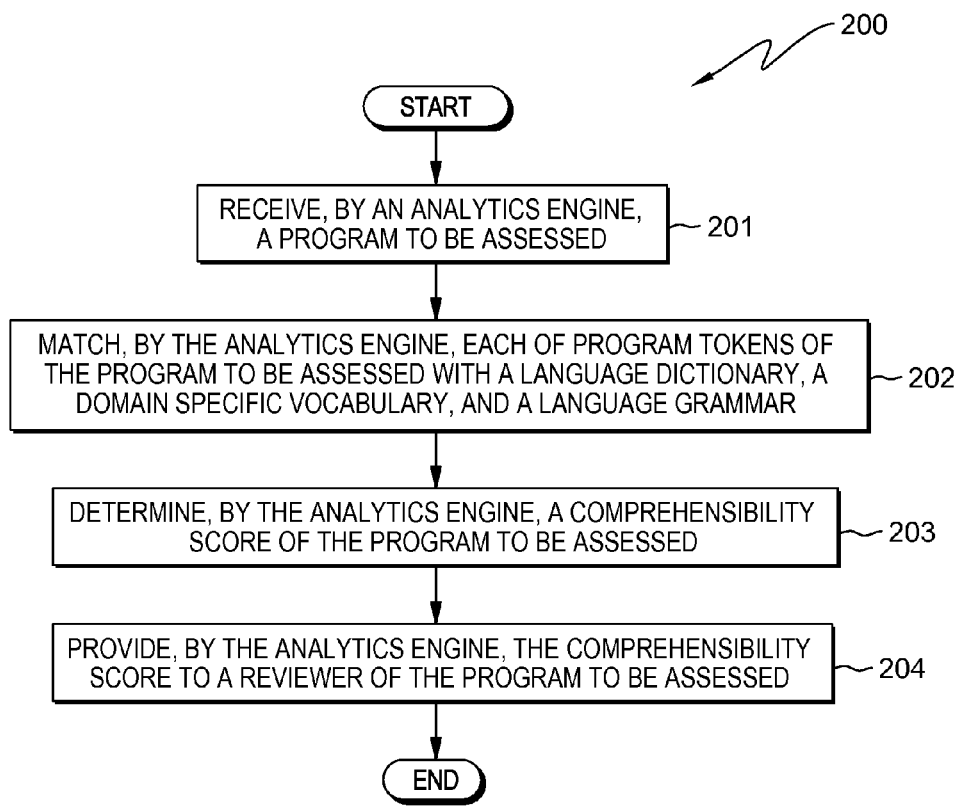
FIG. 2 presents a flowchart showing operational steps for automating calculation of a comprehensibility score for a software program, in accordance with one embodiment of the present invention.

FIG. 2 present flowchart 200 showing operational steps for automating calculation of a comprehensibility score for a software program, in accordance with one embodiment of the present invention. At step 201, an analytics engine (e.g., analytics engine 110 shown in FIG. 1) receives a program to be assessed (e.g., program to be assessed 150 shown in FIG. 1). At step 202, the analytics engine (e.g., analytics engine 110) matches each of program tokens of the program to be assessed (e.g., program to be assessed 150) with a language dictionary (e.g., language dictionary 120 shown in FIG. 1), a domain specific vocabulary (e.g., domain specific vocabulary 130 shown in FIG. 1), and a language grammar (e.g., language grammar 140 shown in FIG. 1). At this step, the analytics engine analyzes code segments and respective comments with help of domain and language specific ontologies. The analytics engine matches each of the program constructs with natural language and domain vocabulary. At step 203, the analytics engine (e.g., analytics engine 110) determines a comprehensive score of the program to be assessed (e.g., program to be assessed 150), based on matching tokens. In an embodiment, the comprehensibility score is calculated by taking a percentage of the total number of matching tokens over the total number of available tokens in the program to be assessed. In another embodiment, the comprehensibility score is a weighted average derived from various categories of non-terminal symbols used or the categories of production rules applied in the program to be assessed. At step 203, the analytics engine (e.g., analytics engine 110) provides the comprehensive score (e.g., comprehensive score shown in FIG. 1) to a reviewer of the program to be assessed (e.g., program to be assessed 150).

Figure 3:
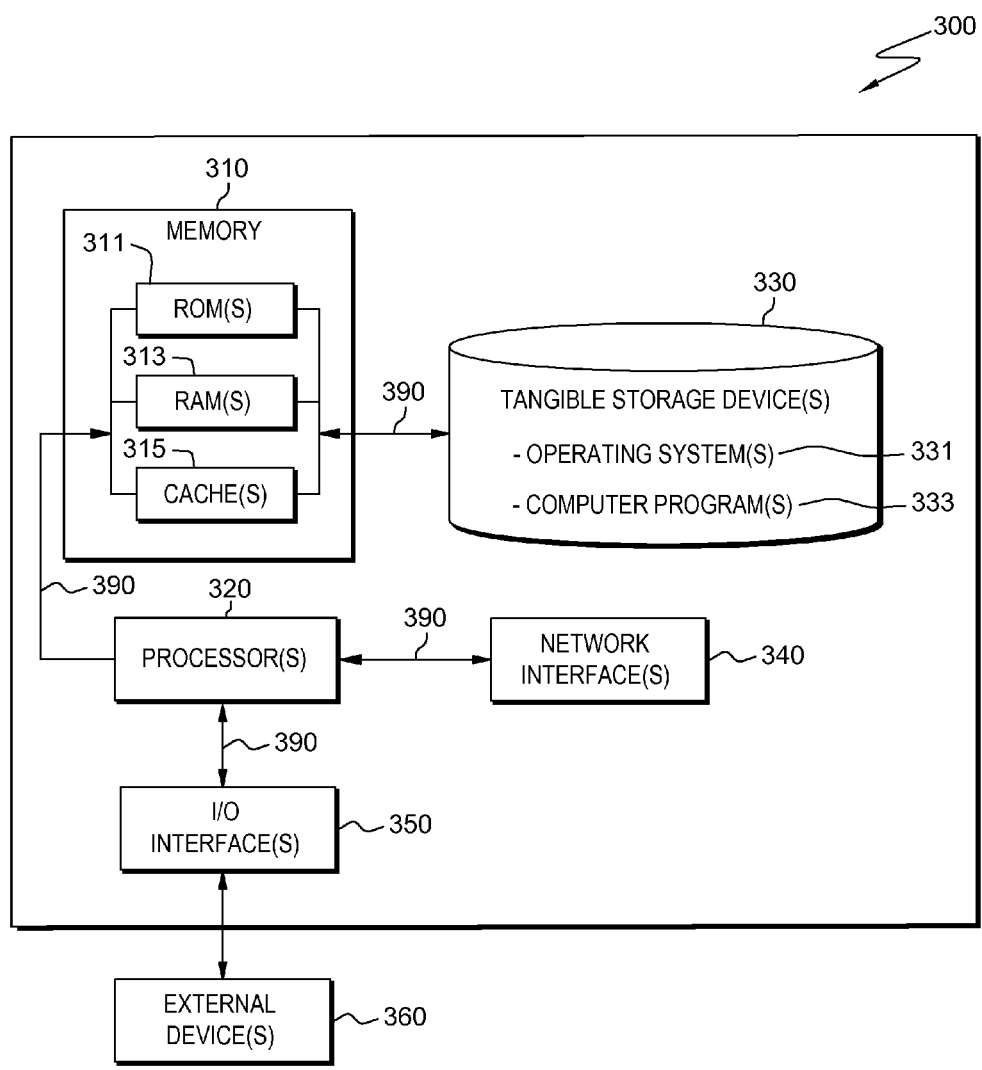
FIG. 3 is a diagram illustrating components of a computer device hosting a system for automating calculation of a comprehensibility score for a software program, in accordance with one embodiment of the present invention.

FIG. 3 is a diagram illustrating components of computer device 300 hosting for a system for automating calculation of a comprehensibility score for a software program, in accordance with one embodiment of the present invention. It should be appreciated that FIG. 3 provides only an illustration of one implementation and does not imply any limitations with regard to the environment in which different embodiments may be implemented.

Referring to FIG. 3, computer device 300 includes processor(s) 320, memory 310, and tangible storage device(s) 330. In FIG. 3, communications among the above-mentioned components of computer device 300 are denoted by numeral 390. Memory 310 includes ROM(s) (Read Only Memory) 311, RAM(s) (Random Access Memory) 313, and cache(s) 315. One or more operating systems 331 and one or more computer programs 333 reside on one or more computer readable tangible storage device(s) 330. Analytics engine 110, language grammar 120, domain specific vocabulary 130, and language dictionaries 140 reside on one or more computer readable tangible storage device(s) 330. Computer device 300 further includes I/O interface(s) 350. I/O interface(s) 350 allows for input and output of data with external device(s) 360 that may be connected to computer device 300. Computer device 300 further includes network interface(s) 340 for communications between computer device 300 and a computer network.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device, such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network (LAN), a wide area network (WAN), and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++, and conventional procedural programming languages, such as the "C" programming language, or similar programming languages. The computer readable program instructions may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture, including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus, or other device to produce a computer implemented process, such that the instructions which execute on the computer, other programmable apparatus, or other device implement the functions/acts specified in the flowchart and/or block diagram block or blocks.

The flowchart and block diagrams in the FIGs illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the FIGs. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method for automating calculation of a comprehensibility score for a software program, the method comprising:
    matching, by an analytics engine on a computer, tokens of the software program with a language dictionary, a domain specific vocabulary, and a language grammar, wherein the tokens are non-terminal symbols and comprise class names, method names, and variable names;
    matching, by the analytics engine, a compound word with different matching words of the language dictionary, in response to determining that the compound word is used in a token;
    calculating, by the analytics engine, a weighted average derived from various categories of the non-terminal symbols used in the software program;
    determining, by the analytics engine, a comprehensibility score for the software program, based on the weighted average derived from the various categories of the non-terminal symbols used in the software program; and providing, by the analytics engine, the comprehensibility score to a reviewer evaluating the software program.

2. The method of claim 1, further comprising:
calculating, by the analytics engine, a percentage of a total number of matching tokens over a total number of the tokens in the software program so as to determine the comprehensibility score.

3. The method of claim 1, further comprising:
calculating, by the analytics engine, a weighted average derived from various categories of production rules applied in the software program so as to determine the comprehensibility score.

4. The method of claim 1, wherein the matching step begins automatically upon the software program being stored as an updated program with respect to an earlier program version in storage within a distributed development environment.

5. A computer program product for automating calculation of a comprehensibility score for a software program, the computer program product comprising a computer readable storage medium having program code embodied therewith, the program code executable to:
match tokens of the software program with a language dictionary, a domain specific vocabulary, and a language grammar, wherein the tokens are non-terminal symbols and comprise class names, method names, and variable names;
match a compound word with different matching words of the language dictionary, in response to determining that the compound word is used in a token;
calculate a weighted average derived from various categories of the non-terminal symbols used in the software program;
determine a comprehensibility score for the software program, based on the weighted average derived from the various categories of the non-terminal symbols used in the software program; and
provide the comprehensibility score to a reviewer evaluating the software program.

6. The computer program product of claim 5, further comprising the program code executable to:
calculate a percentage of a total number of the matching tokens over a total number of the tokens in the software program so as to determine the comprehensibility score.

7. The computer program product of claim 5, further comprising the program code executable to:
calculate a weighted average derived from various categories of production rules applied in the software program so as to determine the comprehensibility score.

8. The computer program product of claim 5, wherein the matching step begins automatically upon the software program being stored as an updated program with respect to an earlier program version in storage within a distributed development environment.

9. A computer system for automating calculation of a comprehensibility score for a software program, the computer system comprising:
one or more processors, one or more computer readable tangible storage devices, and program instructions stored on at least one of the one or more computer readable tangible storage devices for execution by at least one of the one or more processors, the program instructions executable to:
match tokens of the software program with a language dictionary, a domain specific vocabulary, and a language grammar, wherein the tokens are the non-terminal symbols and comprise class names, method names, and variable names;
match a compound word with different matching words of the language dictionary, in response to determining that the compound word is used in a token;
calculate a weighted average derived from various categories of non-terminal symbols used in the software program;
determine a comprehensibility score for the software program, based on the weighted average derived from the various categories of the non-terminal symbols used in the software program; and
provide the comprehensibility score to a reviewer evaluating the software program.

10. The computer system of claim 9, further comprising the program instructions executable to:
calculate a percentage of a total number of matching tokens over a total number of the tokens in the software program so as to determine the comprehensibility score.

11. The computer system of claim 9, further comprising the program instructions executable to:
calculate a weighted average derived from various categories of production rules applied in the software program so as to determine the comprehensibility score.

12. The computer system of claim 9, wherein the matching step begins automatically upon the software program being stored as an updated program with respect to an earlier program version in storage within a distributed development environment.

* * * * *